Figure 1:
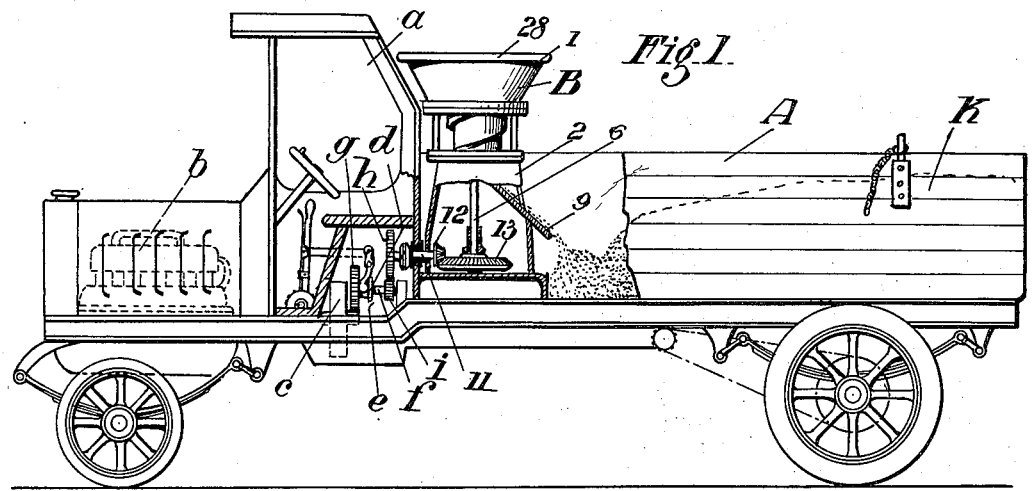

Nov. 1, 1927.

R. PHILIPP 1,647,371

APPARATUS FOR REGENERATING BULKY WASTE METAL

Filed Dec. 16, 1924

Inventor:
Richard Philipp.
By Harold D. Penney
Atty.

Patented Nov. 1, 1927.

1,647,371

UNITED STATES PATENT OFFICE.

RICHARD PHILIPP, OF EISENACH, GERMANY, ASSIGNOR TO THE FIRM MAGNET-WERK G. M. B. H. EISENACH SPEZIALFABRIK FÜR ELEKTROMAGNET APPARATE, OF EISENACH, SAXE-WEIMAR, GERMANY.

APPARATUS FOR REGENERATING BULKY WASTE METAL.

Application filed December 16, 1924, Serial No. 756,350, and in Germany October 17, 1923.

My invention relates to improvements in the apparatus for regenerating bulky waste metal, and more particularly in the method of and apparatus for regenerating waste metal such as tin boxes, enameled metal, etc. found on the garbage heaps of large cities, which matter is at present perfectly worthless, and as a matter of fact must sometimes be disposed of at high cost, if the ground where the matter is disposed is needed for other purposes. Heretofore efforts have been made to collect tin boxes from the garbage heaps and to ship the same to factories for regenerating the tin. However, ordinarily this method is uneconomical because the capacity of the vehicle loaded with the said bulky matter is made use of in an imperfect way. Heretofore the regeneration of other waste metal, and more particularly enameled metal, was out of question, because it is particularly bulky and its value is comparatively low. Therefore, each year millions of tons of waste metal having as a whole a high value remain on the garbage heaps. The object of the improvements is to provide a method and an apparatus by means of which the said waste metal can be collected and put to use in an economical way, and with this object in view I collect the waste metal in vehicles provided with disintegrating machinery, and I disintegrate the same at the place where it is found into a granular material adapted to be shoveled, and I ship the disintegrated matter on the said vehicles to places of further use. When disintegrating the metal the tin boxes and enameled metal are further improved, the waste metal being disintegrated being to a large extent separated from foreign matter, such an the enamel and the paper glued to the metal. Therefore, the disintegrated matter may be directly shipped in the form of valuable raw material from the garbage heaps to central stations from which it is shipped to the factories, or it may be directly shipped to the said factories. By being thus disintegrated the matter requires comparatively little space, so that the vehicles provided with the disintegrating machinery may be used for collecting the waste material from places located great distances apart, which would otherwise not allow the economical regeneration of the metal. When using motor driven trucks for collecting the material I provide means for driving the disintegrating apparatus from the motor of the vehicle, so that the said motor is used not only for the purpose of driving the vehicle, but also while the vehicle is being loaded. Any known or preferred means may be used for disintegrating the waste metal. But I prefer to use the machine shown and described in my copending application for United States patent, Ser. No. 736,089, filed September 5, 1924.

My improved vehicle provided with disintegrating machinery may also be used for other purposes, for example for collecting bulky metal, cuttings from machine tools and other waste material in factories located large distances apart. More particularly in small factories it is not always economical to provide stationary disintegrating machinery for disposing of the metal turnings, because the amount of the waste metal is not sufficient to permit the installment and operation of such machinery in an economical way. By my improved method the waste metal from small plants may be collected in an economical way.

An important feature of my improved apparatus resides in that my vehicle is not used only for bringing the machinery to one place or other, but for removing the disintegrated material.

Figure 2:
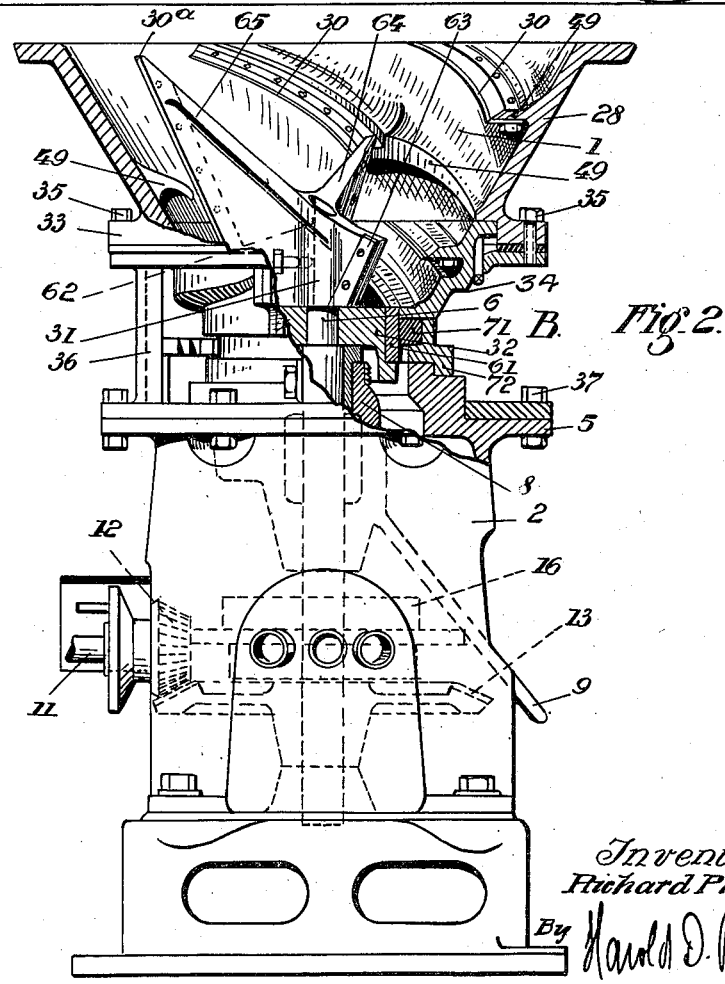

In order that my invention be more clearly understood a vehicle provided with disintegrating machinery has been shown in the accompanying drawings in which the same letters of reference have been used in all the views to indicate corresponding parts. In said drawings, Fig. 1, is an elevation partly in section and showing the vehicle and the disintegrating apparatus, and Fig. 2, is an elevation partly in section and on a larger scale showing the disintegrating apparatus.

In the example shown in the figures the collecting and disintegrating apparatus consists of a motor truck A and a disintegrating apparatus B mounted thereon and preferably disposed at the rear of the seat $a$. When thus disposing the disintegrating apparatus the capacity of the body $k$ of the vehicle is not materially reduced. The disintegrating apparatus is adapted to be operatively connected with the engine $b$ of the vehicle by means of a gear $e$. By means of the said gear the high velocity of the motor $b$ is reduced for connecting the disintegrating apparatus to the motor. The mechanism intermediate the motor and the disintegrating apparatus comprises a gear wheel $g$ meshing with spur teeth provided on the fly wheel of the motor and mounted on a shaft $f$, gear wheels $h$ and $i$, coupling means $d$ and a shaft 11 forming a part of the disintegrating apparatus.

In the operation of the apparatus the truck and the disintegrating apparatus mounted thereon are driven to the garbage heaps by means of the motor of the vehicle, whereupon the said motor is disconnected from the driving wheels and connected with the disintegrating apparatus. After the waste metal has been disintegrated the truck may drive to another garbage heap for collecting and disintegrating waste metal, and after it has been filled with disintegrated material it drives to a central station or to a factory for delivering the disintegrated material.

In the example shown in the drawings the disintegrating apparaus B comprises a disintegrating member 1 and a frame 2 supporting the same and having the driving mechanism mounted therein. The main driving shaft of the machine is vertically mounted, preferably by means of a foot step bearing arranged in the base and by a collar bearing 8 in the upper portion of the supporting base. The body of the collar bearing is preferably made integral with an inclined wall 9 which passes through the base to the outside. This inclined wall serves as a delivery chute for the comminuted material, and for this purpose it is outwardly extended through an opening of the base.

The vertical main shaft 6 is actuated by a horizontal shaft 11, and by means of the train of bevel gears 12, 13.

The comminuting and disintegrating means proper comprise a hopper 28 equipped with relatively stationary knives or abutments 30 provided on the inner wall thereof, and two knife heads 31 and 32 mounted upon the upper end of the shaft 6 which projects from below into the hopper 28. This hopper or funnel consists of an upper funnel section 33 and a lower funnel section 34, the upper funnel section 33 being rigidly connected by means of screws 35 to a supporting carrier or cage 36 which is rigidly mounted by screws 37 on the base 2.

In the form of construction shown by way of example the hopper 28 is in the form of an inverted truncated cone. The upper section 33 contains four series of counter-knives or abutments, slantingly arranged on the inner wall of the hopper. Each of the four series of abutments starts from the upper edge of the hopper. The knives are secured to spaced projections 49 arranged along substantially helical lines on the wall of the hopper and they bear on the bottom sides of the ribs 49. They are retained by screw bolts the heads of which are housed in corresponding recesses of the ribs 49, while the lower ends of the screws are engaged by bars bearing against the bottom sides of the knives 30. By means of set screws accessible from the outside of the hopper the inner ends of which are bearing against the outer edges of the knives 30, these knives may be inwardly adjusted. The upper sides of the ribs 49 are inclined and as smooth as possible, so that the material thrown into the hopper may not be retained or prevented from descending.

The bottom sides of the ribs 49 are sharply projecting towards the inside of the funnel from the walls thereof, thereby producing very powerful abutments. These ribs or abutments, however, do not constitute continuous helical lines in view of their being interrupted by recesses adapted to permit the direct passing of the material under treatment from one of the helical lines formed by the knives 30 to the system of knives 30 next below the same. With the same end in view, the series of knives of the lower section 34 of the funnel which are likewise helically arranged, do not constitute the direct continuation of the groups of knives of the upper section 32 of the hopper, but gaps are provided upon the points of transition from one group of knives to the other, through which gaps the material under treatment may pass directly. The helical lines formed by the ribs 49 of the lower section of the hopper do not form the direct continuation of the helical lines formed by the ribs 49 of the upper hopper section, but they are preferably breaking lines or laterally shifted relatively thereto, so that the front portions of the relatively lower knives are disposed above the rear portions of the relatively upper knives so as to constitute larger gaps adapted to afford room for the passage of a portion of the articles to be comminuted or disintegrated. In view of the fact that the knife blades are difficult to be manufactured in an exactly helical form they are preferably made of single smaller pieces which are subsequently aggregated. The several single pieces may in this case consist of flat steel plates which are fastened to the accordingly broken faces of the ribs or abutments 49. The cutting edges proper of the knives may represent parts of ellipses.

The inner edges of the stationary knives 30 of the hopper or funnel 28 are substantially arranged upon the outside of a cone with downwardly directed apex. Upon the same cone surface are arranged the cutting edges of the rotating knives $30^a$ of the knife head 31. The head 31 comprises a hub portion which is rigidly connected to the shaft 6 by means of a wedge or key 62 extending the entire length of the cutting unit. The hub portion 61 forms a common integral piece of casting with the three arms 63, 64 and 65 carrying the knives 30ª. These arms are of different lengths, the arm 65 being the longest. Then follows, seen in the direction of the rotation of the knife head, the arm 64 of medium length and thereupon the shortest arm 63. The knives 30ª do not exactly coincide with the generatrices of the cone surfaces in which they are arranged, but with their lower ends the cutting edges 30 are situated somewhat back of the cone generatrices passing through their upper ends, and as seen in the direction of rotation of the knife head. In consequence thereof the action of the knives 30ª upon the material under treatment produces a backward-pressure component having the tendency to lift the knife head 31. The action of this component is opposed by the weight of the knife head and of its shaft 6, and before all, by the weight of a particularly heavy coupling member 16 which may be secured to the lower portion of the shaft 6. If in the case of very resisting foreign bodies being introduced into the machine the pressure upon the knife head 31 becomes too large its vertical components will gain the ascendency over the action of the weights mentioned, so that the knife head is automatically raised, and the knives become adapted to yield to the particular foreign bodies. The possibility of raising the knife head, therefore, constitutes an additional safeguard against breakage.

Below the knife head 31 the other knife head 32 is mounted upon the shaft 6. The connection of the head 32 with the shaft 6 is effected by means of the key or wedge 62 retaining the upper knife head 31, and which is downwardly correspondingly extended.

The knives 61 of the lower knife head 32 cooperate with a row of knives 71 engaging a recessed portion of an annulus 72 which is disposed between the bottom end of the lower hopper section 34 and the upper rim portion 5 of the base 2 of the casing. The circular row of knives 71 is provided at its inner wall with abutments or counter-knives the edges of which constitute steep helical lines, so that they form angles with the cutting edges of the rotating knives 61.

For further description and illustration of the disintegrating apparatus reference is made to my copending application for patent Ser. No. 736,089, filed September 5, 1924. The mode of operation of the apparatus B is substantially as follows: If it is, for instance, desired to have the machine operate on enameled articles, such as pots, pails and other waste metal objects, the material to be treated without any previous disassembling is thrown from above in whole pieces into the funnel 28, where the smaller pieces are immediately caught between the revolving knives 30ª and the stationary knives 30. The material is compressed, bent, cracked, twisted, and wrung by the cooperation of the arms of the rotating knife head 31 with the stationary knives 30 mounted on the ribs 49 of the hopper 28, and is finally cut up more or less between the knives 30 and 30ª. Besides, by the action of the rotating knives 30ª the coating still adhering to the metal pieces is scraped off. This is particularly true of tough coatings, such as paper pasted thereto, while enamel coatings have already been substantially broken and split off during the deformation preceding the comminution proper. The split-off enamel drizzles down as a kind of loose, sand-like mass between the more or less disintegrated pieces of metal and runs out of the apparatus along the chute 9 in advance of the comminuted pieces of metal obtained in the later stages of the process.

The larger articles which cannot directly lodge themselves between the cutting edges of the rotating knives 30ª and the wall of the hopper are first passing into the cavity formed by the inner edges of the knife arms 63, 64 and 65 and by a portion of the wall of the hopper 28, which cavity substantially possesses the shape of an inverted truncated cone the axis of which is however eccentric to the axis of rotation of the knife head 31. This eccentric arrangement assists the catching of the articles between the rotating knife-arms on the one hand, and the abutments formed by the stationary knives 30 and their supporting ribs 49 on the other hand. Even larger articles which need not be taken apart or assorted on that account, will be liable to become stuck to the ribs 49 after some time during the course of their turning around caused by the knife head 31. They are then mostly caught by the wedge shaped upper end portions of the rotating knives 30ª, and are run up the knives and carried along thereby, which operation is combined with a vigorous deformation by compression, bending, wringing and squeezing. This stage is followed by the comminuting and disintegrating process proper produced by the cooperation of the knives 30 and 30ª. This procedure is continued in the interior of the lower section 34 of the hopper, where, moreover, the main action is the further cutting up of the larger parts of material and the further deformation of the smaller parts which are partly still provided with their enamel or other coatings. Into the subsequent or finishing comminuting means encompassing the knife head 32 the pieces of material are already delivered in a condition in which they have been substantially freed from their coatings. This part of the device completes the comminution of the working material which is then discharged from the apparatus by being delivered onto the chute 9 and allowed to run off therefrom. In some cases I provide means for separating the metal from the foreign matter such as enamel, paper, and the like.

I claim:

1. A regenerating and salvaging apparatus comprising a vehicle having a body; and a disintegrating apparatus on said vehicle constructed and positioned to receive bulky containers and reducing and disintegrating them to small volume, and to discharge them into the body.

2. A regenerating and salvaging apparatus comprising a vehicle having a receptacle body; and a disintegrating apparatus in said body constructed and positioned to receive bulky articles thrown thereinto by a person standing on the ground and to reduce, disintegrate and granulate, to small volume, bulky metal containers, and to discharge them into the body for transportation.

3. A regenerating and salvaging apparatus comprising a vehicle having a seat, a receptacle body and a motor for driving the vehicle; and a small compact disintegrating apparatus in said body close to the seat and driven by said motor and constructed and positioned to receive bulky articles thrown thereinto by a person standing on the ground and to reduce, disintegrate and granulate, to small volume, bulky metal containers such as boxes, pots and cans, and to discharge them into the body for economizing space in transportation.

In testimony whereof I affix my signature.

RICHARD PHILIPP.